United States Patent [19]

Togai et al.

[11] Patent Number: 5,069,181
[45] Date of Patent: Dec. 3, 1991

[54] OUTPUT CONTROL APPARATUS FOR AN INTERNAL COMBUSTION ENGINE

[75] Inventors: Kazuhide Togai, Takatsuki; Yoshiaki Danno, Kyoto; Masato Yoshida, Kyoto; Makoto Shimada, Kyoto; Katsunori Ueda, Kyoto, all of Japan

[73] Assignee: Mitsubishi Jidosha Kogyo Kabushiki Kaisha, Tokyo, Japan

[21] Appl. No.: 573,133

[22] PCT Filed: Jan. 19, 1990

[86] PCT No.: PCT/JP90/00063
§ 371 Date: Sep. 18, 1990
§ 102(e) Date: Sep. 18, 1990

[87] PCT Pub. No.: WO90/08889
PCT Pub. Date: Sep. 8, 1990

[30] Foreign Application Priority Data

Jan. 31, 1989 [JP] Japan .................................. 1-21278
Jan. 31, 1989 [JP] Japan .................................. 1-21285
Jan. 31, 1989 [JP] Japan .................................. 1-21286

[51] Int. Cl.$^5$ ............................................. F02D 7/00
[52] U.S. Cl. ................................... 123/399; 123/340; 123/339
[58] Field of Search ............... 123/399, 340, 350, 339, 123/421, 425, 435, 478

[56] References Cited

U.S. PATENT DOCUMENTS

| | | | |
|---|---|---|---|
| 4,625,690 | 12/1986 | Morita | 123/340 |
| 4,653,349 | 3/1987 | Kaneyuki | 74/796 |
| 4,697,561 | 10/1987 | Citron | 123/339 |
| 4,862,854 | 9/1989 | Oda et al. | 123/399 |
| 4,898,138 | 2/1990 | Nishimura et al. | 123/399 |

FOREIGN PATENT DOCUMENTS

| | | | |
|---|---|---|---|
| 3505063 | 8/1986 | Fed. Rep. of Germany | 123/399 |
| 61-223244 | 10/1986 | Japan | 123/399 |
| 63-45438 | 2/1988 | Japan | 123/399 |
| 63-81551 | 3/1988 | Japan | 123/399 |

Primary Examiner—Raymond A. Nelli
Attorney, Agent, or Firm—Frishauf, Holtz, Goodman & Woodward

[57] ABSTRACT

In an output control apparatus for an internal combustion engine according to this invention, a target torque of a driving shaft of an automobile is determined in accordance with the pedaling stroke of an accelerator pedal, and a deviation between the target torque and an actual torque of the driving shaft is obtained. On the assumption that the whole system of the automobile, including the internal combustion engine, is in a steady-state operation mode, on the other hand, a steady-state output torque of the internal combustion engine, required for applying the target torque to the driving shaft, is obtained. In the output control apparatus, moreover, a steady-state suction air amount of the internal combustion engine is obtained such that the steady-state output torque is obtained in the internal combustion engine, and this steady-state suction air amount is corrected in accordance with a feedback amount based on the aforesaid deviation, so that a target suction air amount of the internal combustion engine is determined, and the opening of a throttle valve is controlled so that the target suction air amount can be obtained.

8 Claims, 10 Drawing Sheets

OUTPUT CONTROL APPARATUS FOR AN INTERNAL COMBUSTION ENGINE

TECHNICAL FIELD

This invention relates to an apparatus for controlling the output of an internal combustion engine by, for example, adjusting the opening of a throttle valve in the internal combustion engine.

BACKGROUND ART

In an internal combustion engine mounted on an automobile, for example, a throttle valve of this engine is mechanically connected to an accelerator pedal so that the valve is driven in accordance with the depth of pedaling of the accelerator pedal, that is, the pedaling stroke thereof. With the engine of this type, therefore, an operator can control the engine output, that is, the torque to be transmitted to a driving shaft of the automobile, by adjusting the opening of the throttle valve by means of the accelerator pedal.

In recently offered engines for automobiles, the accelerator pedal and the throttle valve are electrically connected without being mechanically connected to each other, in contrast with the conventional case, whereby the opening of the throttle valve is adjusted and then the engine output is controlled. According to this attempt, when the accelerator pedal is first worked, its pedaling stroke is detected by means of a sensor, and the target output of the engine, that is, the target torque of the driving shaft of the automobile, is determined in accordance with a signal from the sensor. Meanwhile, an electric motor is connected to the valve shaft of the throttle valve, and this electric motor drives the throttle valve so that the opening of the throttle valve corresponds to the aforesaid target torque.

When electrically controlling the engine output, as described above, the target torque of the driving shaft is unconditionally determined in accordance with the pedaling stroke of the accelerator pedal. Therefore, the actual torque of the driving shaft should preferably be changed following up the target torque without delay. After the pedaling stroke of the accelerator pedal is actually changed, that is, after the target torque of the driving shaft is changed, however, a delay, until the actual torque of the driving shaft reaches to the target torque depending on this change, is inevitably caused. As for this delay, it includes a delay corresponding to a time interval which elapses from the instant that air passes through the throttle valve until a suction stroke in which the air is sucked into a cylinder chamber of the engine through a surge tank and compression and explosion strokes for a fuel-air mixture in the cylinder chamber are undergone. If the automobile is furnished with an automatic transmission, moreover, there is a delay in transmission of power attributable to the torque ratio of a torque converter in a power transmission path which extends from the output shaft of the engine to the driving shaft.

After the opening of the throttle valve is changed, as mentioned before, if a delay is caused until this change appears as a change of the actual torque of the driving shaft after undergoing the processes of production and transmission of the aforesaid power, the drive of the automobile cannot be satisfactorily controlled in accordance with the pedaling stroke of the accelerator pedal, that is, the opening of the throttle valve.

This invention has been contrived in consideration of these circumstances, and its object is to provide an output control apparatus for an internal combustion engine, capable of shortening the response time which elapses from the instant that a target torque of a driving shaft of an automobile is determined until an actual torque of the driving shaft attains to the target torque, thereby ensuring a satisfactory drive of the automobile.

DISCLOSURE OF THE INVENTION

An output control apparatus for an internal combustion engine according to this invention comprises: adjusting means for varying the output of the engine in accordance with an adjusting variable; means for determining a target torque of a driving shaft of an automobile; means for detecting an actual torque of the driving shaft; means for obtaining a deviation between the target torque and the actual torque obtained from these means; means for obtaining a steady-state output torque of the engine, required for applying the target torque to the driving shaft, on the assumption that the whole system of the automobile, including the engine, is in a steady-state operation mode; means for obtaining a reference adjusting variable of the adjusting means so that the steady-state output torque is produced in the engine; means for obtaining a target adjusting variable of the adjusting means by correcting the reference adjusting variable in accordance with a feedback amount based on the deviation; and means for regulating an actual adjusting variable of the adjusting means so that the actual adjusting variable becomes equal to the target adjusting variable.

According to the output control apparatus for an internal combustion engine described above, the steady-state output torque of the engine is obtained in accordance with the target torque of the driving shaft, and the reference adjusting variable of the adjusting means, required for the engine to produce the steady-state output torque, is obtained. This reference adjusting variable is corrected by means of the feedback amount based on the deviation between the target torque and the actual torque, whereby the target adjusting variable of the adjusting means is obtained. When the target adjusting variable of the adjusting means is thus determined in accordance with the steady-state output torque of the engine and the aforesaid deviation, a delay in the processes of production and transmission of power can be eliminated, and also, the actual torque of the driving shaft can be adjusted to the target torque thereof with high accuracy.

BEST MODE OF CARRYING OUT THE INVENTION

Figure 1:
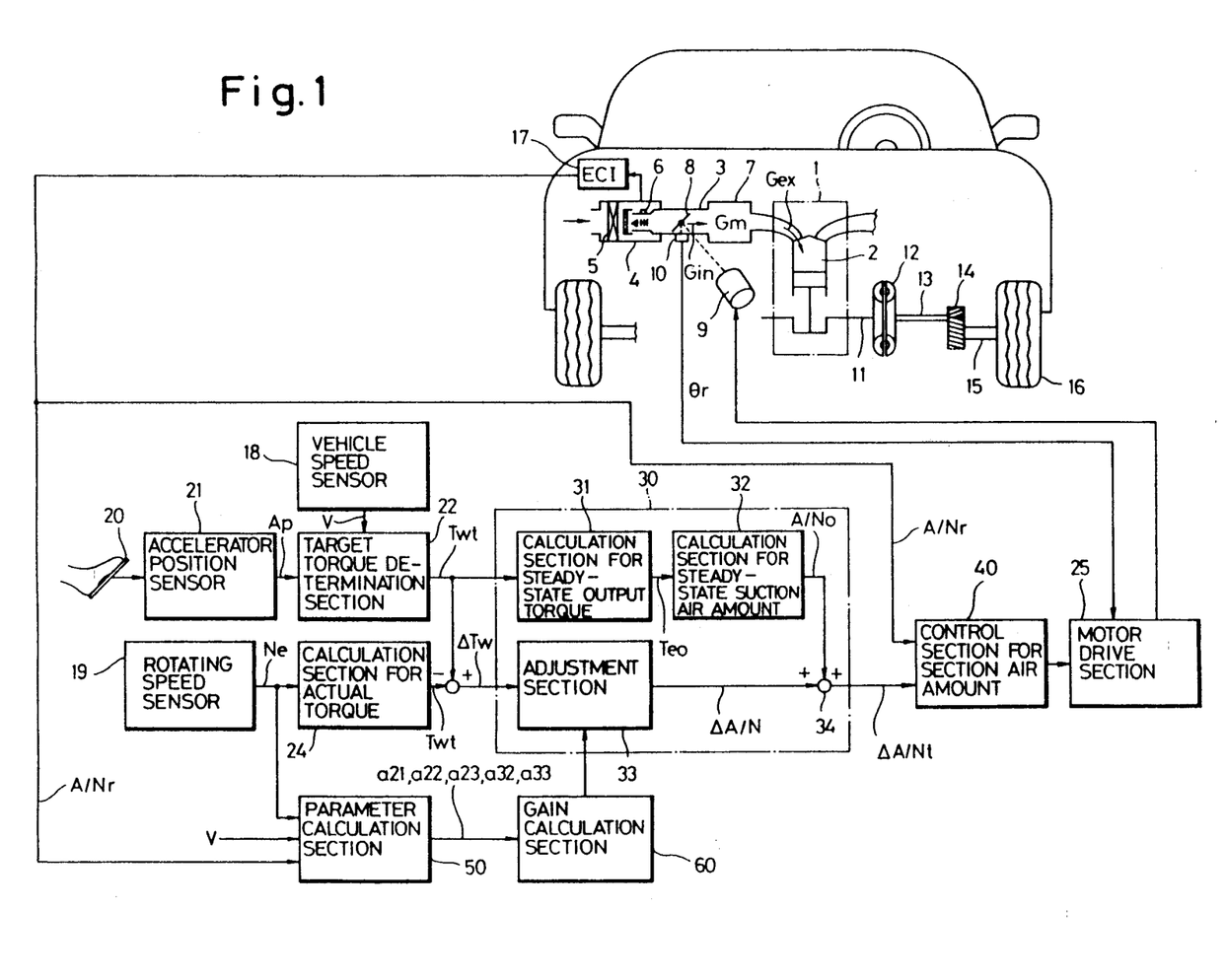
FIG. 1 is a block diagram showing an output control apparatus according to this invention, combined with a diagram schematically showing part of an automobile to which this output control apparatus is applied.

Referring to FIG. 1, there is shown a block diagram of an output control apparatus for an internal combustion engine applied to an automobile. Before explaining this output control apparatus, the internal combustion engine and a power transmission path from this internal combustion engine to the driving shaft of the automobile will be described in brief.

The internal combustion engine, that is, gasoline engine 1, is indicated by a chain-line block in FIG. 1. A combustion chamber 2 of this engine 1 is connected to suction passage 3 through a suction valve (not shown). An air cleaner 4 is located at that end portion of the suction passage 3 which is remote from the engine 1, and this air cleaner 4 comprises a filter element 5 and airflow sensor 6 of a Karman-vortex type. The airflow sensor 6 detects the amount of air sucked in through the filter element 5, that is, the amount of suction air, and delivers a signal corresponding to the suction air amount. The signal from the airflow sensor 6 is supplied to an electronic control unit 17 for controlling the operation of a fuel injection device (not shown), and the electronic control unit 17 calculates an actual suction air amount A/Nr for each cycle when the engine 1 executes one cycle including a suction stroke, a compression stroke, an explosion stroke, and an exhaust stroke, obtains the amount of fuel to be supplied to the engine 1 on the basis of the actual suction air amount A/Nr. Then, the fuel injection device injects the fuel of the amount determined in the electronic control unit 17 into the combustion chamber 2 of the engine 1 with a predetermined timing.

That part of the suction passage 3 which is situated close to the engine 1 is formed as a surge tank 7, and a throttle valve 8 is located in that portion of the suction passage 3 between the surge tank 7 and the air cleaner 4. The throttle valve 8 can smoothly rock from a fully-closed position, where the suction passage 3 is nearly closed, to a fully-open position, in order to adjust the amount of air flowing through the suction passage 3.

The valve shaft of the throttle valve 8 projects to the outside of the suction passage 3, and its projecting end is connected to the output shaft of a DC motor 9. Thus, the rocking motion of the throttle valve 8, that is, the opening of the throttle valve 8, can be controlled by means of the DC motor 9.

Further, a throttle opening sensor 10 is attached to the projecting end of the valve shaft of the throttle valve 8. The throttle opening sensor 10, which is formed of a potentiometer, outputs an actual opening $\theta r$ of the throttle valve 8 as a voltage signal.

Meanwhile, a pump of a torque converter 12 is connected to a crankshaft or an output shaft 11 of the engine 1, which is connected to the piston of the engine 1 by means of a connecting rod, and a turbine of the torque converter 12 is connected to a transmission 14 by means of a connecting shaft 13. The transmission 14 is connected to a driving shaft 15, and a driving wheel 16 is connected to the driving shaft 15. Here the aforesaid torque converter 12, connecting shaft 13, and transmission 14 constitute an automatic transmission.

The following is a description of an output control apparatus applied to the aforesaid engine 1.

As shown in FIG. 1, the output control apparatus comprises an accelerator position sensor 22 which detects the depth of pedaling or pedaling stroke of an accelerator pedal 21 of an automobile. The accelerator position sensor 22 supplies a signal Ap corresponding to the pedaling stroke of the accelerator pedal 21 to a target torque determination section 22. The determination section 22 is also supplied with a vehicle speed signal v detected by means of a vehicle speed sensor 18. The vehicle speed sensor 18 (not shown in detail) calculates a vehicle speed V in accordance with the rotating speed of the driving shaft 15.

Figure 2:
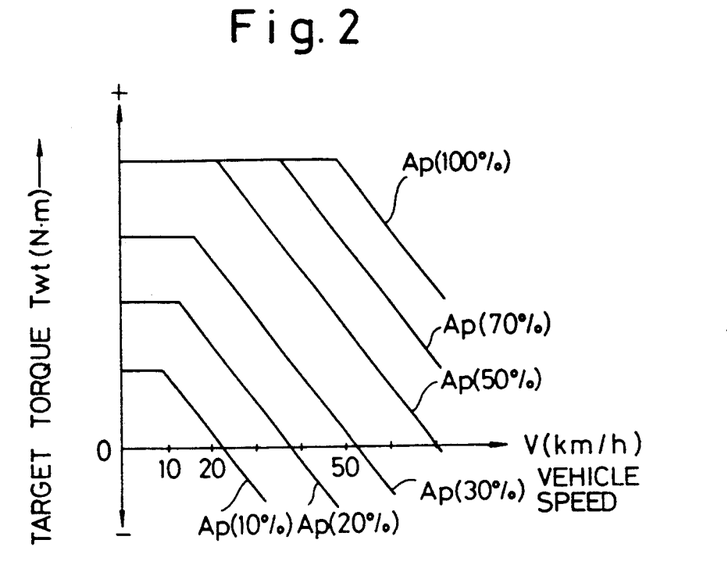
FIG. 2 is a diagram showing the conditions of determination for a target torque of a driving shaft.

Based on the aforesaid signal Ap and the vehicle speed signal v or vehicle speed V, the section 22 determines a target torque Twt of the driving shaft 15 with reference to the graph of FIG. 2. The percentages for various characteristic curves in FIG. 2 indicate the ratios of pedaling strokes to the overall stroke of the accelerator pedal 20. Thus, when the vehicle speed V is within a low-speed region, the target torque Twt is determined depending only on the value of the signal Ap, without regard to the vehicle speed V. This indicates that the target torque Twt of the driving shaft 15 is set only in accordance with the depth of pedaling of the accelerator pedal 20 so that a feeling of acceleration of the automobile can be obtained when the accelerator pedal 20 is further worked in the state that the vehicle speed V is within the low-speed region at the time of starting the automobile, etc. If the vehicle speed V is not lower than a predetermined value, on the other hand, the target torque Twt takes a value which decreases as the vehicle speed V increases, even though the depth of pedaling of the accelerator pedal 20 is fixed. This indicates that the target torque Twt of the driving shaft 15 is determined so that the vehicle speed V can be maintained even when the accelerator pedal 20 is further worked, if the vehicle speed V is not lower than the predetermined value.

The target torque Twt of the driving shaft 15 determined in the section 22 is supplied to a subtraction point 23, and is also supplied to a calculation section 30 for calculating a target suction air amount.

Figure 3:
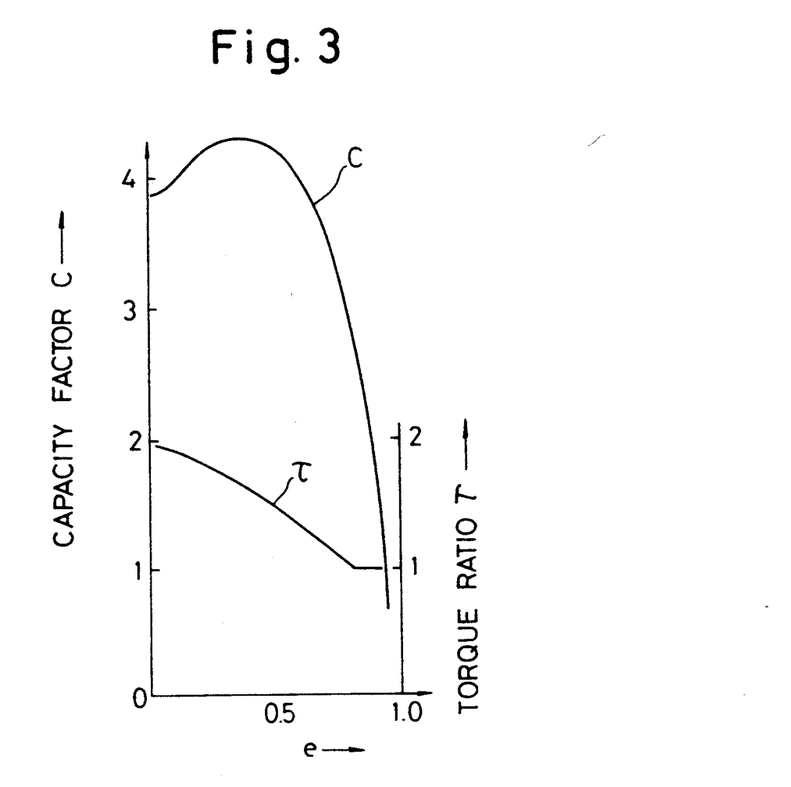
FIG. 3 shows characteristic curves of a torque converter used to calculate an actual torque of the driving shaft.

Meanwhile, an actual torque Twm of the driving shaft 15 calculated in an actual torque calculation section 24 is supplied to the aforesaid subtraction point 23. In the case of this embodiment, the actual torque Twm is calculated in the following manner. In the calculation section 24, which is supplied with a rotating speed Ne of the engine 1 detected by means of a rotating speed sensor 19, the actual torque Twm of the driving shaft 15 is calculated in accordance with the following equation, based on the rotating speed Ne, and a torque capacity factor C and a torque ratio τ of the torque converter 12.

$$Twm = \tau(e) \times C(e) \times Ne^2,$$

where e is the ratio in rotating speed between the output shaft 11 of the engine 1 and the turbine of the torque converter 12. Based on the value of this ratio e, the aforesaid factor C and torque ratio τ can be obtained with reference to FIG. 3. As a result, the actual torque Twm can be calculated according to the above equation.

The actual torque Twm of the driving shaft 15 need not always be obtained by calculation, and a torque meter may be attached to the driving shaft 15 so that the actual torque Twm of the driving shaft 15 can be obtained by being directly detected by means of the torque meter.

The actual torque Twm calculated in the actual torque calculation section 24 is supplied to the subtraction point 23, as mentioned before. At this subtraction point 23, the actual torque Twm is subtracted from the target torque Twt, whereby a deviation ΔTw between these torques Twt and Twm is obtained.

The aforementioned calculation section 30 for a target suction air amount will be described further in detail. The calculation section 30 can be further divided into three sections 31, 32 and 33. First, in the calculation section 31, for a steady-state output torque the target torque Twt of the driving shaft 15 obtained in the determination section 22 is received, and a steady-state output torque Teo of the engine 1 relative to the target torque Twt on the assumption that the engine 1 is in a steady-state operation mode, is calculated according to the following equation.

$$Teo = Twt/(\rho \times \tau),$$

where ρ is the gear ratio of the transmission 14.

Figure 4:
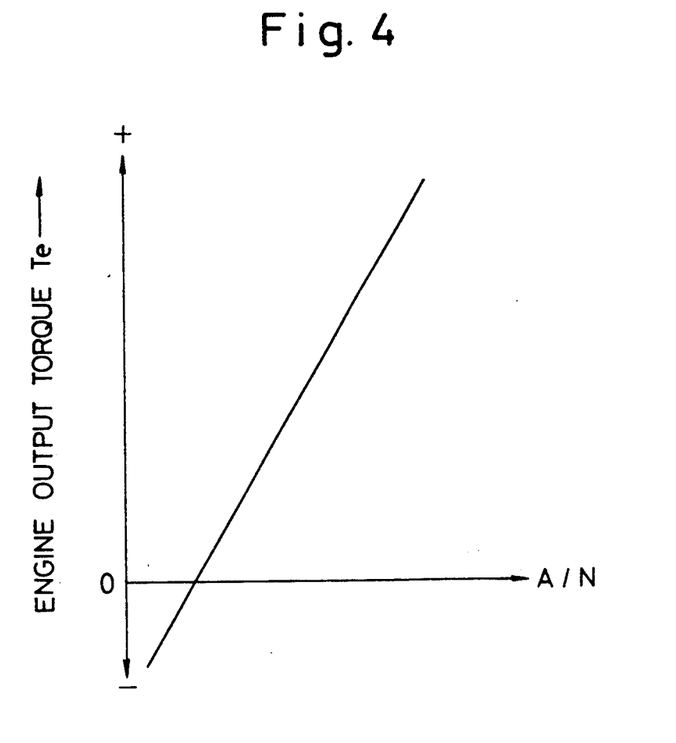
FIG. 4 is a diagram showing the relationship between the amount of suction air and the output torque of an engine.

The steady-state output torque Teo, thus calculated in the calculation section 31, is then supplied to the calculation section 32, for a steady-state suction air amount and a steady-state suction air amount A/No corresponding to the steady-state output torque Teo is obtained in this calculation section 32. Here the output torque Te of the engine 1 relative to a suction air amount A/N when the engine 1 is in the steady-state operation mode is previously obtained as shown in FIG. 4. When the steady-state output torque Teo is obtained in the calculation section 31, therefore, the steady-state suction air amount A/No corresponding to the steady-state output torque Teo can be obtained from FIG. 4 in the next calculation section 32. If the relationship between the suction air amount A/N and the output torque T of the engine 1 shown in FIG. 4 is previously obtained as a function, the steady-state suction air amount A/No can be calculated also according to this function.

In the adjustment section 33, moreover, the deviation ΔTw obtained at the subtraction point 23 is received, and a adjusting variable ΔA/N for feedback control is obtained in accordance with this deviation ΔTw. In obtaining the adjusting variable ΔA/N in the adjustment section 33, any of PID, PI, and PD operations may be utilized.

The steady-state suction air amount A/No and the adjusting variable ΔA/N obtained in the calculation section 32 and the adjustment section 33 are individually supplied to an addition point 34 to be added therein, whereupon a target suction air amount A/Nt is calculated. As is evident from the above description, the target suction air amount A/Nt is obtained from the steady-state suction air amount a/No determined in accordance with the target torque Twt in consideration of a correction based on the deviation ΔTw between the target torque Twt and the actual torque Twm, that is, the adjusting variable ΔA/N.

Figure 5:
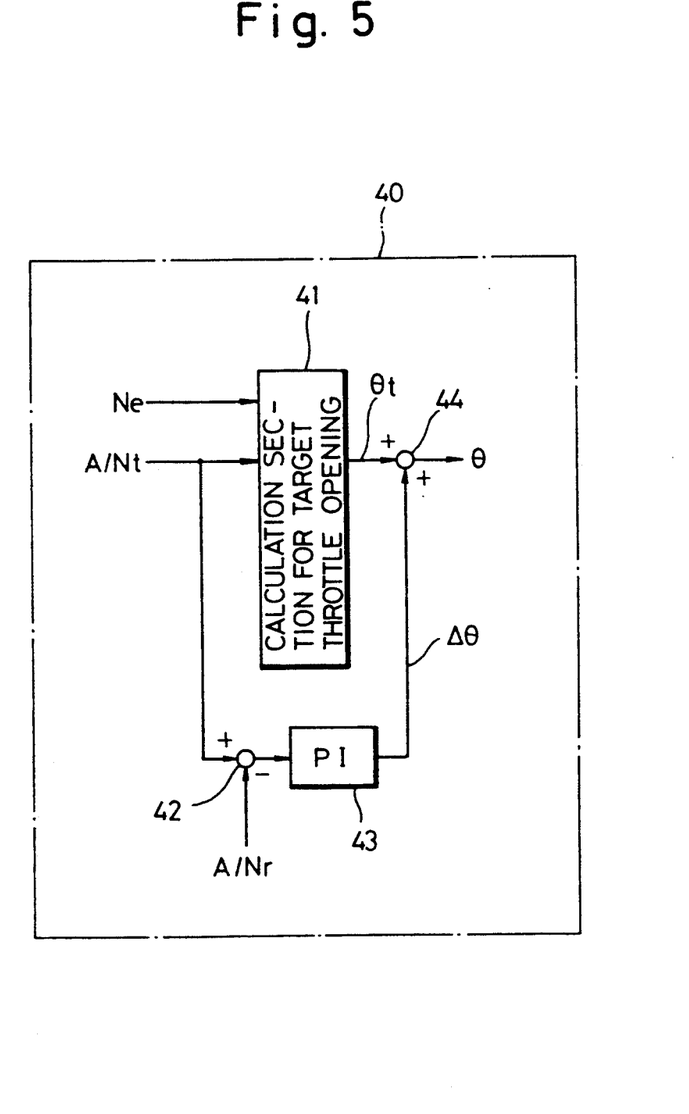
FIG. 5 is a diagram showing details of a suction air amount control section shown in FIG. 1.
Figure 6:
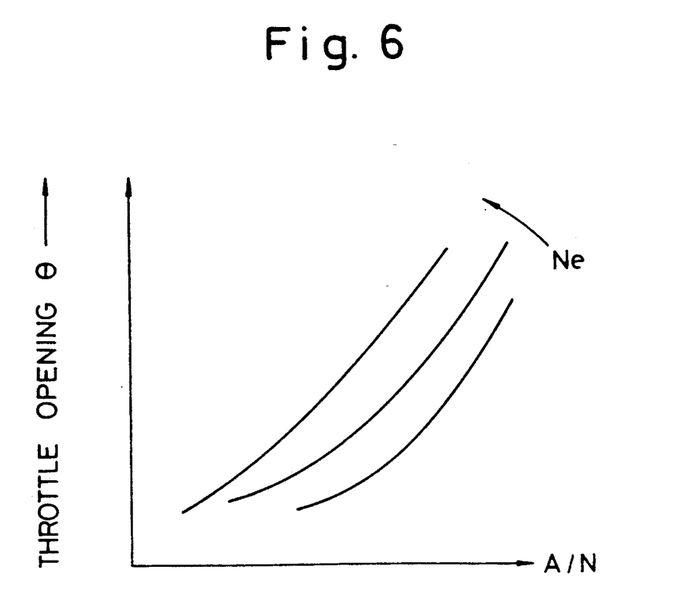
FIG. 6 is a diagram showing the relationships between the suction air amount and the throttle opening.

The target suction air amount A/Nt obtained in this manner is then supplied to a control section 40 for a suction air amount, that is, a calculation section 41 for a target throttle opening in the control section 40, as shown in detail in FIG. 5. Also, the calculation section 41 is supplied with the aforesaid engine rotating speed Ne from the rotating speed sensor 19 for the engine 1. In the calculation section 41, a throttle opening θt is obtained from FIG. 6 in accordance with the engine rotating speed Ne and the target suction air amount A/Nt. The characteristic curves of FIG. 6, which represent the relationships between the target suction air amount A/Nt and the engine rotating speed Ne, shift in the direction of the arrow of FIG. 6 as the engine rotating speed Ne increases.

Meanwhile, the target suction air amount A/Nt is supplied to a subtraction point 42 as well as to the calculation section 41, and the substraction point 42 is supplied with the actual suction air amount A/Nr obtained in the aforesaid electronic control unit 17. At the subtraction point 42, a deviation obtained by subtracting the actual suction air amount A/Nr from the target suction air amount A/Nt, that is, the deviation between the target suction air amount A/Nt and the actual suction air amount A/Nr, is obtained, and this deviation becomes a adjusting variable Δθ for the feedback control as it passes through the adjustment section 43 based on the PI operation. This adjusting variable Δθ and the throttle opening θt obtained in the calculation section 41 are added at an addition point 44, whereupon a final target throttle opening θ1 is calculated. The target throttle opening θ1 thus calculated is then supplied to a drive section 25 for the DC motor 9, while the drive section 25 is also supplied with the aforesaid actual opening θr from the throttle opening sensor 10. In the drive section 25, the target throttle opening θ1 and the actual opening θr are compared, and the operation of the DC motor 9 is controlled so that the difference between the two openings is zero.

Referring now to the flow chart of FIG. 7, the operation of the output control apparatus according to the aforementioned first embodiment will be described in order.

When the accelerator pedal 20 is worked, the pedaling stroke of this accelerator pedal 20 is detected by the accelerator position sensor 21. In Step S1, the target torque Twt of the driving shaft 15 is determined in accordance with the signal from the accelerator position sensor 21 and the vehicle speed V in accordance with FIG. 2.

In the next Step S2, the steady-state output torque Teo is calculated from the target torque Twt, and in Step S3, the steady-state suction air amount A/No is obtained from the map of FIG. 4 in accordance with the steady-state output torque Teo.

The moment the aforesaid Step S1 is executed, on the other hand, Step S4 is also executed. In Step S4, the engine rotating speed Ne, the actual suction air amount A/Nr, and the vehicle speed V are detected individually, and in Step S5, the actual torque Twm of the driving shaft 15 is calculated on the basis of these detected data.

In the next Step S6, the deviation $\Delta$Tw between the target torque Twt previously obtained in Step S1 and the actual torque Twm is obtained, and in Step S7, the adjusting variable $\Delta$A/N for the feedback control of the target suction air amount A/Nt is calculated in accordance with the deviation $\Delta$Tw. Thus, in Step S8 next to Steps S3 and S7, the target suction air amount A/Nt is obtained by correcting the steady-state suction air amount A/No, that is, the target suction air amount A/Nt is calculated by adding the adjusting variable $\Delta$A/N to the steady-state suction air amount A/No.

In the final Step S9, the opening of the throttle valve 8 is controlled so that the actual suction air amount A/Nr is equal to the target suction air amount A/No. Actually, however, the operation of the DC motor 9 is controlled so that the actual opening $\theta$r of the throttle valve 8 is equal to the target throttle opening $\theta$1 corresponding to the target suction air amount A/Nt, as mentioned before.

According to the output control apparatus of the first embodiment described above, the steady-state suction air amount A/No corresponding to the target torque Twt of the driving shaft 15 is first obtained, and this steady-state suction air amount A/No is corrected by means of the correction based on the deviation $\Delta$Tw between the target torque Twt and the actual torque Twm, that is, by means of the adjusting variable $\Delta$A/N for the feedback control, whereby the target suction air amount A/No is calculated. Thus, the aforementioned delay in response in the processes of production and transmission of power can be eliminated.

Thus, according to this invention, when the target torque Twt is determined, the steady-state output torque Teo or the steady-state suction air amount A/No is calculated from this target torque Twt, in consideration of the gear ratio $\rho$ of the transmission 14 and the torque ratio $\tau$ of the torque converter 12. Immediately when the actual suction air amount A/Nr is controlled on the basis of the steady-state suction air amount A/No, therefore, the output torque of the engine 1 itself takes a value in the vicinity of the target torque Twt of the driving shaft 15. As a result, in view of the processes of production and transmission of the power, the time interval which elapses from the instant that the target torque Twt is determined by the working on the accelerator pedal 20 until the actual torque Twm of the driving shaft 15 reaches to the target torque Twt can be shortened by a large margin, so that the responsiveness of the output torque of the engine 1 can be improved.

Meanwhile, the target suction air amount A/Nt is obtained by adding the adjusting variable $\Delta$A/N, determined according to the deviation $\Delta$Tw between the target torque Twt and the actual torque Twm, to the aforesaid steady-state suction air amount A/No. In obtaining this target suction air amount A/Nt, moreover, the aforesaid actual torque Twm is calculated in consideration of the torque capacity factor C and the torque ratio $\tau$ of the torque converter 12. Thus, the power transmission delay in the path from the engine 1 to the driving shaft 15 can be eliminated by controlling the actual suction air amount A/Nr in accordance with the aforesaid target suction air amount A/Nt, so that the actual torque Twm of the driving shaft 15 can be highly accurately adjusted to the target torque Twt.

Figure 8:
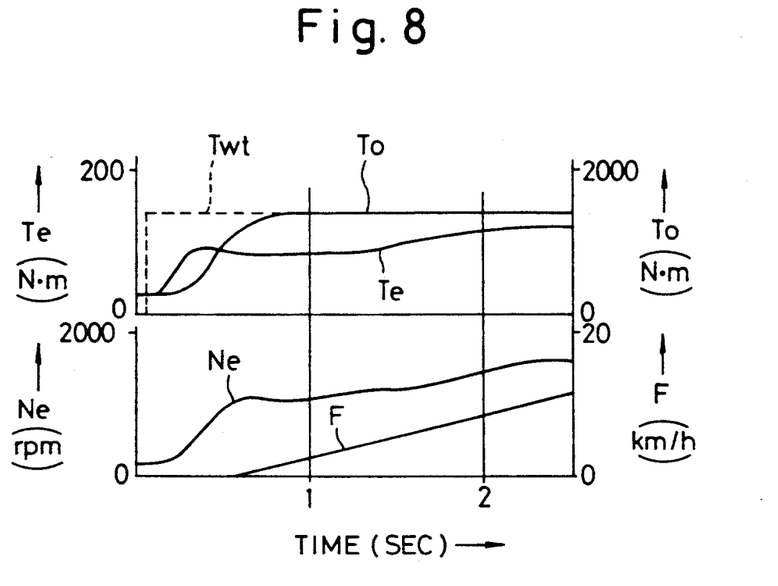
FIG. 8 is a diagram showing the results of control of the torque of the driving shaft according to the first embodiment.

Referring now to FIG. 8, there are shown the results of measurement of the actual torque To of the driving shaft 15 obtained by actually driving the automobile. As seen from FIG. 8, when the target torque Twt is determined, the actual torque To quickly attains to the target torque Twt while both the output torque Te of the engine 1 and the engine rotating speed Ne are changing, and is kept at the level of the target torque Twt.

Figure 9:
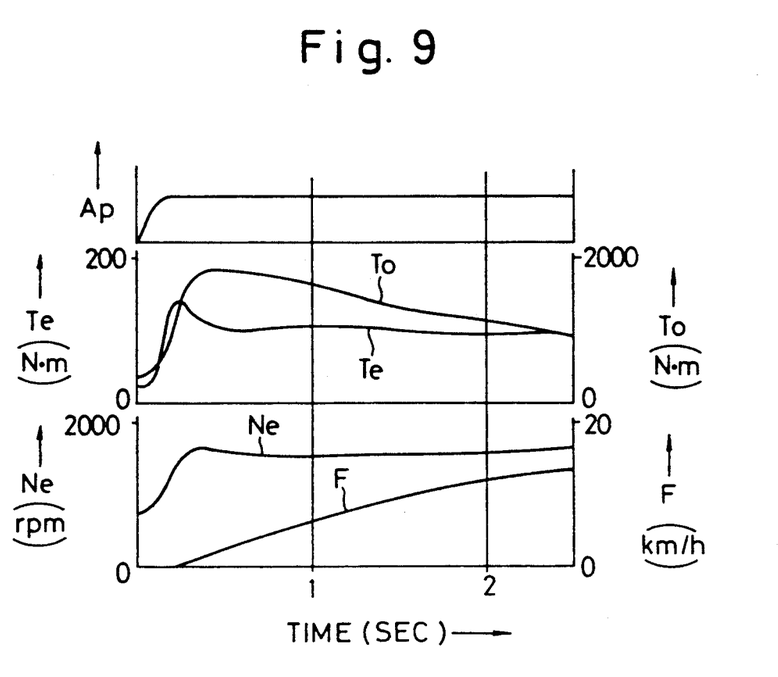
FIG. 9 is a diagram showing the results of control of the driving shaft in an automobile whose accelerator pedal and throttle valve are connected mechanically.

Referring now to FIG. 9, there is shown for reference the case of an automobile in which the accelerator pedal 20 and the throttle valve 8 are mechanically connected to each other. In the case of FIG. 9, the pedaling stroke of the accelerator pedal 20 is kept constant, so that the engine rotating speed Ne and the output torque Te of the engine 1 are both stable. The actual torque To of the driving shaft 15, however, is reduced with the lapse of time. This is attributable to the fact that the torque ratio of the torque converter 12 and the like change in a nonlinear manner in the power transmission path from the engine 1 to the driving shaft 15. In the case of the output control apparatus of this invention, therefore, it can be believed that in keeping the actual torque To of the driving shaft 15 at the level of the target torque Twt, the engine rotating speed Ne and the output torque Te of the engine 1 are changed so as to cancel the bad influences of the nonlinear elements in the power transmission path. In FIGS. 8 and 9, symbol F designates the vehicle body speed.

This invention is not limited to the first embodiment described above, and the following is a description of a second embodiment. Since an output control apparatus of the second embodiment has the same basic arrangement as the output control apparatus of the first embodiment, the second embodiment will be described also with reference to FIG. 1.

In the case of the second embodiment, as seen from FIG. 1, a parameter calculation section 50 and a gain calculation section 60 are added.

The calculation sections 50 and 60 will now be described in brief. The calculation section 50 is stored with a mathematical model which linearly represents the operation mode of the engine 1, considering that the engine 1 is in an operation mode deviated from the steady-state operation mode, in the processes of production and transmission of the power of the automobile. In the calculation section 50, therefore, various parameters in this mathematical model are obtained by inverse calculation based on the actual suction air amount A/Nr, engine rotating speed Ne, and vehicle speed V supplied to the calculation section 50. The parameters of the mathematical model obtained in the calculation section 50 are supplied to the gain calculation section 60. If the whole mechanism of the automobile, including a feedback control circuit composed mainly of the adjustment section 33, is regarded as one system, this calculation section 60 calculates gains for the feedback control or gains for the PID operation in the case of this embodiment, i.e., proportional gain, differential gain, and integral gain, in accordance with the aforesaid parameters so that the characteristics obtained before the torque is actually transmitted to the driving shaft 15 after air is sucked into the engine 1 in this system closely resemble the transfer characteristics of a normative response system. In the case of this second embodiment, therefore, the adjustment section 33 calculates the adjusting variable $\Delta$A/N for the feedback control from the deviation $\Delta Tw$ between the target torque $Twt$ and the actual torque $Twm$ in accordance with the PID operation expressed as follows:

$$\Delta A/N = c0 \times \int(\Delta Tw) + c1 \times (\Delta Tw) + c2 \times d(\Delta Tw)/dt.$$

where c0, c1 and c2 are the integral, proportional, and differential gains, respectively.

Alternatively, the individual gains may be obtained from a map on the basis of the values of the individual parameters of the mathematical model, supplied from the calculation section 50, the map being previously prepared by calculating the values of the individual gains from the parameter values and then stored in the calculation section 60.

Figure 10:
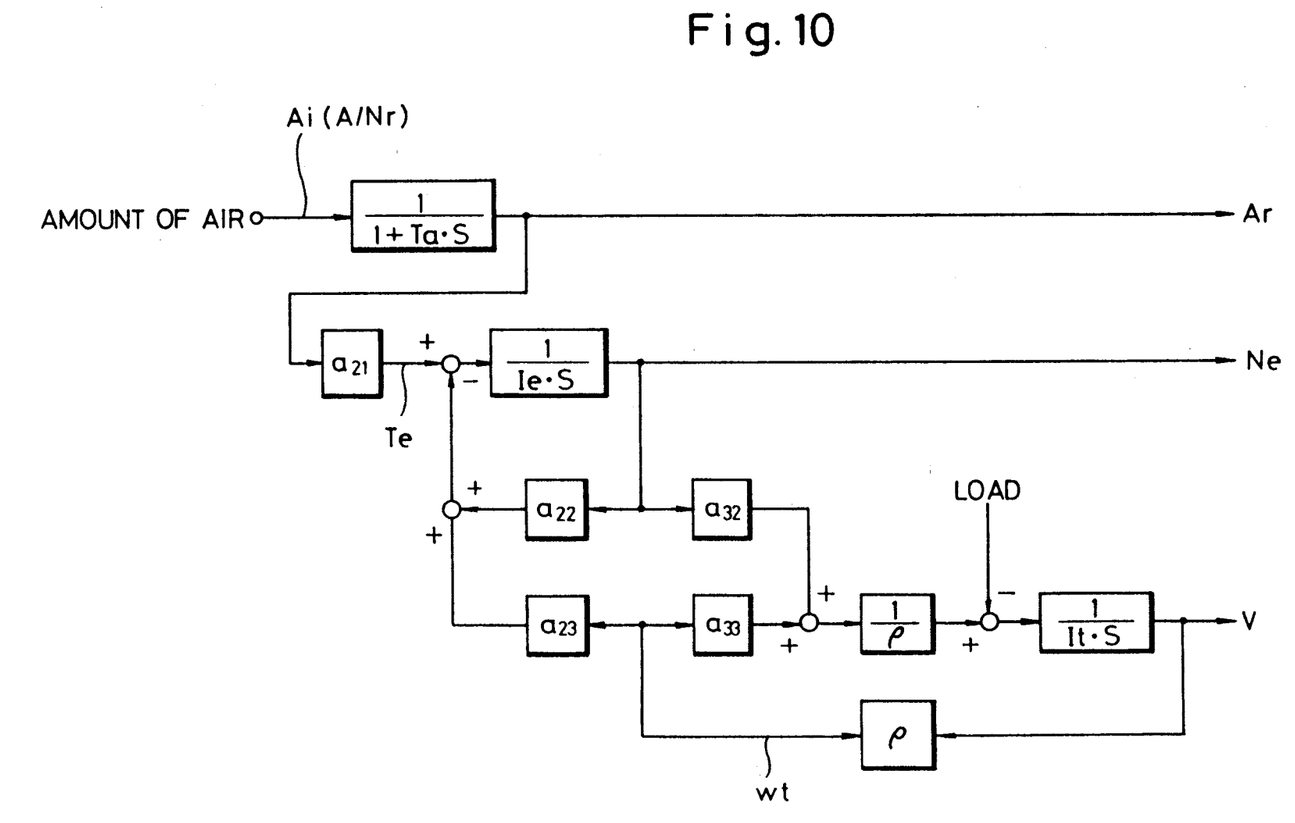
FIG. 10 is a block diagram showing a mathematical model used in a second embodiment.

Referring to FIG. 10, there is shown the mathematical model stored in the calculation section 50. This mathematical model indicates the way the air sucked in through the throttle valve 8 is linearly reflected in the behavior of the automobile, that is, the torque of the driving shaft 15.

In FIG. 10, reference symbol Ar designates the amount of air for the explosion stroke which is corresponds to the output torque of the engine 1, while a21, a22, a23, a32 and a33 designate the parameters of the mathematical model.

The amount of air passed through the throttle valve 8, that is, actual suction air amount Ai (A/Nr), is converted into the air amount Ar by means of a suction delay element $[1/(1+Ta \times S)]$. Also, the air amount Ar is converted into the output torque Te of the engine 1 by means of the parameter a21, and this output torque Te is converted into the engine rotating speed Ne by means of an inertia element $[1/(Ie \times S)]$ of the engine 1.

The engine rotating speed Ne is returned to the input side of the inertia element $[1/(Ie \times S)]$ via the parameter a22, and is converted into the vehicle speed V by means of the parameter a32, a gear ratio element $[1/\rho]$, and a inertia element $[1/(It \times S)]$ of the vehicle body. Then, the vehicle speed V is converted into a rotational angular speed $\omega t$ of the turbine of the torque converter 12 by means of the gear ratio $[\rho]$. The rotational angular speed $\omega t$, like the engine rotating speed Ne, is returned to the input side of the inertia element $[1/(Ie \times S)]$ via the parameter a23, and is also returned to the input side of the element $[1/\rho]$ via the parameter a33.

In the above description, Ta, S, Ie, It and $\rho$ represent, respectively, the following values:

Ta: Time constant determined by the capacity of the suction passage 3 and the cylinder capacity of the engine 1,
S: Transfer function,
Ie: Moment of inertia of the engine 1,
It: Moment of inertia of the vehicle body,
$\rho$: Gear ratio of the transmission 12.

When the engine rotating speed Ne is converted into the vehicle speed V, as shown in FIG. 10, this conversion is made in consideration of the load relative to the road surface.

The aforesaid parameter a21 represents a conversion factor obtained from the relationship between the suction air amount A/N and the output torque Te of the engine 1 shown in FIG. 4, while the parameters a22, a23, a32 and a33 correspond to the characteristics of the torque converter 12 of FIG. 3 used in calculating the actual torque Twm.

Thus, it is possible to calculate the air amount Ar from the air amount Ai and to obtain the individual parameters by inverse calculation from the engine rotating speed Ne and the vehicle speed V measured actually.

The following is a description of processes before the preparation of the aforementioned mathematical model.

First, a change of mass per unit time of air in the suction air capacity at the region of the suction passage 3 on the lower-course side of the throttle valve 8 is expressed by the difference between the amount of air introduced from the throttle valve 8 and the amount of discharge into a cylinder chamber of the engine 1.

$$\dot{G}m = Gin - Gex, \quad (1)$$

where Gm is the mass of air in the suction air capacity, Gin is the amount of air passing through the throttle valve 8 per unit time, and Gex is the amount of air introduced into the cylinder chamber per unit time. For a better understanding of Gm, Gin and Gex, these values are illustrated on the suction passage 3 of FIG. 1.

Since Gex is proportional to Gm and the engine rotating speed Ne, it can be given by the following equation.

$$Gex = Gm \times Ne/To, \quad (2)$$

$$To = (V1 + V2) \times 120/(V1 \times \eta),$$

where V1 is the suction air capacity, V2 is the capacity of the cylinder chamber, $\eta$ is the volumetric efficiency, and To is the time constant per revolution of the engine 1.

Substituting equation (2) into equation (1), we obtain equation (3) as follows:

$$\dot{G}m = Gin - (Gm \times Ne)/To. \quad (3)$$

Equation (3) indicates that the air amount has a transfer characteristic of primary delay.

Rewriting equation (3) by utilizing the relationship between Gex and Gm in equation (2), we obtain equation (4).

$$\dot{G}ex = (Ne/To)(Gin - Gex). \quad (4)$$

Dividing both sides of equation (4) by the rotating speed per unit time of the engine 1, we obtain equation (5) related to the suction air amount from equation (4).

$$\dot{A}o = (Ne/To)(-Ao + Ai), \quad (5)$$

where Ao is the amount of air sucked into the cylinder chamber per unit time, and Ai is the amount of air passed through the throttle valve 8 per unit time.

The air amount Ai is reflected in the output torque of the engine 1 only after air of the amount Ai is sucked into the cylinder chamber and the compression and explosion strokes are performed. The time required for the execution of the processes from the suction stroke to the explosion stroke is represented as a dead time in the feedback control, and this dead time is equivalent to 1.5 revolutions of the engine 1 as reckoned from the start of the suction stroke. Thus, if the dead time is (Lo/Ne), this dead time (Lo/Ne) is given by equation (6).

$$(Lo/Ne) = (60 \times 1.5)/Ne = 90/Ne. \quad (6)$$

Based equation (6), equation (7) represents the relationship between the air amounts Ao and Ar as a function of time t.

$$Ar = Ao \times (t-(Lo/Ne)). \tag{7}$$

Meanwhile, it is assumed that the air amount Ar, the rotational angular speed $\omega e$ of the engine 1, and the rotational angular speed $\omega t$ of the turbine change by very small amounts $\Delta Ar$, $\Delta\omega e$ and $\Delta\omega t$, respectively, from the values for the steady-state operation mode, in response to a change $\Delta Ai$ of the air amount Ai, when the engine 1 and the vehicle body are in the steady-state operation mode. With respect to the air amount, in this case, the following relation holds true.

$$\dot{A}r + \Delta\dot{A}r = ((\omega e + \Delta\omega e)/TL) \times (-Ar - \Delta Ar) + Ai + \Delta Ai. \tag{8}$$

In obtaining equation (8), the time constant of the transfer characteristic before the air amount Ai is converted into the air amount Ar is approximated as a primary delay of $(\omega e/TL)$.

If the engine 1 is in the steady-state operation mode, we have $Ar = Ai$, so that equation (8) can be expressed as equation (9).

$$\Delta\dot{A}r = (\omega e/TL) \times (-\Delta Ar + \Delta Ai). \tag{9}$$

With respect to the rotational angular speed $\omega e$ of the engine 1, moreover, the following equation holds true.

$$I(\dot{\omega}e + \Delta\dot{\omega}e) = Te(\omega e + \Delta\omega e, Ar + \Delta Ar) - Tp(\omega e + \Delta\omega e, \omega e + \Delta\omega t), \tag{10}$$

where Tp is the absorption torque of the torque converter 12.

If the output torque Te of the engine 1 and the absorption torque Tp change by $\Delta Te$ and $\Delta Tp$, respectively, when the air amount Ar changes by $\Delta Ar$, we obtain $$Te(\omega e + \Delta\omega e, Ar + \Delta Ar) = Te(\omega e, Ar) + \Delta Te, \tag{11}$$

$$Te(\omega e + \Delta\omega e, \omega t + \Delta\omega t) = Te(\omega e, \omega t) + \Delta Tp. \tag{12}$$

Since the engine 1 is in the steady-state operation mode, the following equation is obtained with respect to the angular speeds $\omega e$ and $\omega t$ and the air amount Ar.

$$\dot{\omega}e = 0, \tag{13}$$

$$Te(\omega e, Ar) = Tp(\omega e, \omega t). \tag{14}$$

An equation for the very small change of the rotational angular speed $\omega e$ of the engine 1 is given as follows:

$$Ie \cdot \Delta\dot{\omega}e = \Delta Te - \Delta Tp. \tag{15}$$

Using $\Delta\omega e$, $\Delta\omega t$, and $\Delta Ar$, $\Delta Te$ and $\Delta Tp$ are given by the following linear differential equation.

$$\Delta Te = (\partial Te/\partial\omega e) \times \Delta\omega e + (\partial Te/\partial Ar) \times \Delta Ar, \tag{16}$$

$$\Delta Tp = (\partial Tp/\partial\omega e) \times \Delta\omega e + (\partial Tp/\partial Ar) \times \Delta\omega t. \tag{17}$$

Likewise, the following linear differential equation is obtained with respect to the turbine of the torque converter 12.

$$\Delta\dot{A}r = -Ta \times \Delta Ar + Ta \times \Delta Ai, \tag{18}$$

$$\Delta\dot{\omega}e = (\partial Te/\partial Ar)(1/Ie) \times \Delta Ar + ((\partial Te/\partial\omega e) - (\partial Tp/\partial\omega e)) \times (1/Ie)\Delta\omega e + (\partial Tp/\partial\omega t) \times (1/Ie) \times \Delta\omega t, \tag{19}$$

$$\Delta\dot{\omega}t = (\partial Tt/\partial\omega e)(1/It) \times \Delta\omega e + ((\partial Tt/\partial\omega t) - (\partial Tl/\partial\omega t)) \times (1/It) \times \Delta\omega t. \tag{20}$$

Here, in equation (19), $(\partial Te/\partial Ar)$, $((\partial Te/\partial\omega e) - (\partial Tp/\partial\omega e))$, and $(\partial Tp/\partial\omega t) \times (1/Ie)$ constitute the parameters a21, a22 and a23, respectively.

In equation (20), moreover, $(\partial Tt/\partial\omega e)$ and $((\partial Tt/\partial\omega t) - (\partial Tl/\partial\omega t))$ constitute the parameters a32 and a33, respectively.

Tt is the output torque of the torque converter 12, and Tl is the torque equivalent to the load of the road surface, as mentioned before.

Accordingly, the aforesaid system is given by the following state space representation formats.

$$\dot{\omega} = A\omega - Bu, \tag{21}$$

$$y = C \times \omega, \tag{22}$$

where
$\omega$ = state vector of $[\Delta Ar, \Delta\omega e, \Delta\omega t]^t$,
A = coefficient of $\Delta Ar$, $\Delta\omega e$ and $\Delta\omega t$ in the system matrixes (18), (19) and (20) of [aij],
B = input factor vector of $[Ta, 0, 0]^t$,
C = output factor vector (e.g., [0, 0, 1] for the turbine rotating speed),
u = input,
y = output.

The above description is a description of the processes before the preparation of the mathematical model.

The following is a description of transfer functions as references for the calculation of the individual gains in the gain calculation section 60.

A transfer factor G(s) between the input u and the output y in equations (21) and (22) can be expressed by the following equation based on the definition of transfer functions.

$$G(s) = C \times [sI - A]^{-1} \times B, \tag{23}$$

where s and I are an element for a differential effect and a unit matrix, respectively.

Based on equation (23), a transfer function Ge(s) between the suction air and the rotational angular speed $\omega e$ of the engine 1 and a transfer function Gt(s) between the suction air and the rotational angular speed $\omega t$ of the turbine of the torque converter 12 are given, respectively, by the following equations.

$$Ge(s) = (b1 \times a21 \times (s - a33))/H(s), \tag{24}$$

$$Gt(s) = (b1 \times a21 \times a32)/H(s), \tag{25}$$

where $$H(s) = (s - a11) \times (s - a22) \times (s - a33) - (s - a11) \times a23 \times a32, \tag{26}$$

and further, $b1 = Ta$ and $a11 = -Ta$.

In obtaining a transfer function between the suction air and the torque of the driving shaft 15 by rearranging it into a transfer function between the suction air and the turbine torque of the torque converter 12, a linear differential equation related to $\Delta Tt$ is given by the following equation.

$$\Delta Tt = (\partial Tt/\partial \omega e) \times \Delta \omega e + (\partial Tt/\partial \omega t) \times \Delta \omega t, \quad (27)$$

where $$(\partial Tt/\partial \omega e) = a32 \times It, \quad (28)$$

$$(\partial Tt/\partial \omega t) = (a33 + k) \times It. \quad (29)$$

Substituting equations (24) and (25) into the above equations, we obtain a transfer function Gf(s) between the suction air and the turbine torque given by the following equation.

$$Gf(s) = (It \times b1 \times a21 \times a32 \times (s+k))/H(s), \quad (30)$$

where k is a coefficient based on the load and calculated as follows:

$$k = \partial T1/(\partial \omega t \times It). \quad (31)$$

Since the value of k is substantially zero, however, the transfer function Gf(s) is given by $$Gf(s) = (It \times b1 \times a21 \times a32 \times s)/H(s). \quad (32)$$

Here T1 is the torque equivalent to the load of the road surface.

Dividing the numerator and denominator of equation (32) by (It×b1×a21×a32) so that the numerator of equation (32) is s only, we obtain $$Gf(s) = s/h(s). \quad (33)$$

Here $$\begin{aligned} h(s) &= H(s)/(It \times b1 \times a21 \times a32) \\ &= h0 + h1S + h2s^2 + \ldots \end{aligned} \quad (34)$$

Thus, equation (33) represents the transfer function of the automobile as an object of control.

The following is a description of processes for obtaining the individual gains for the PID operation.

Figure 11:
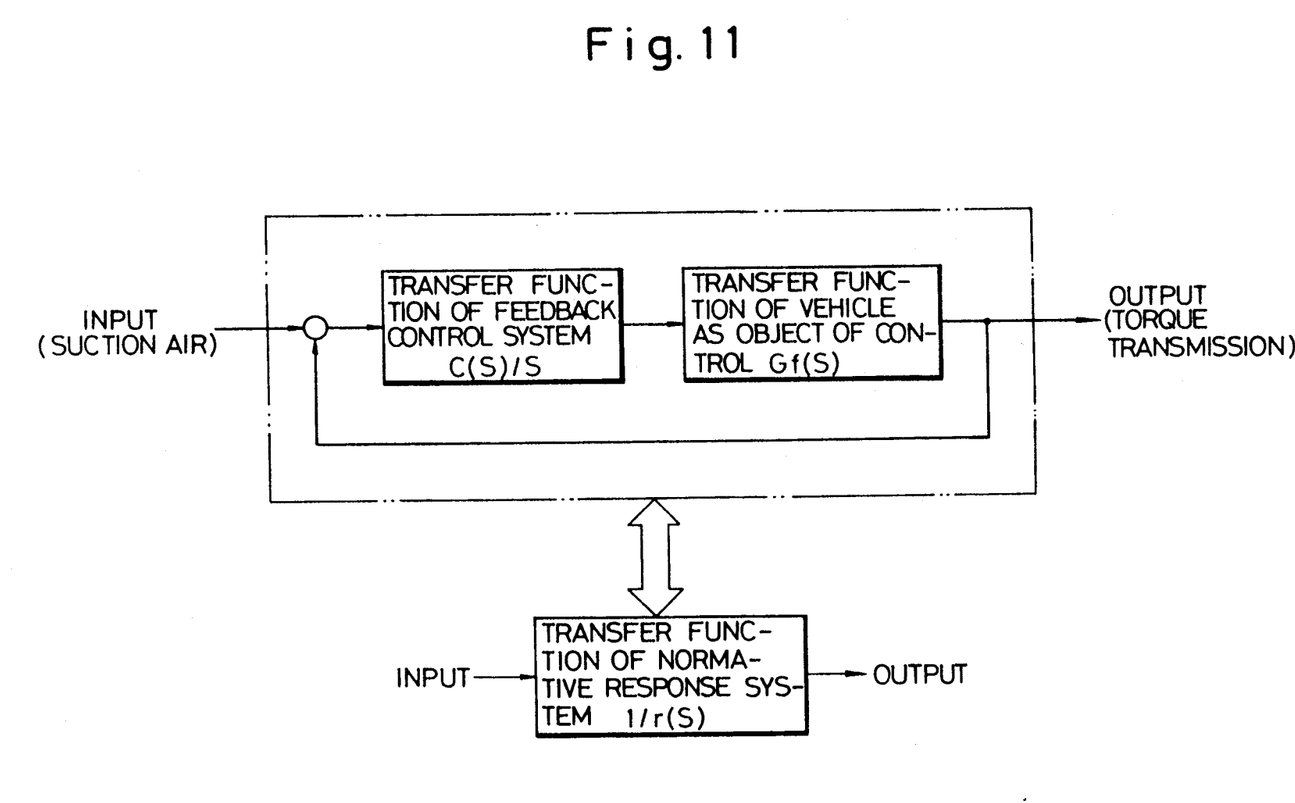
FIG. 11 is a diagram showing the relationships between a normative response system and the respective transfer functions of a feedback control system and the automobile according to the second embodiment.
Figure 12:
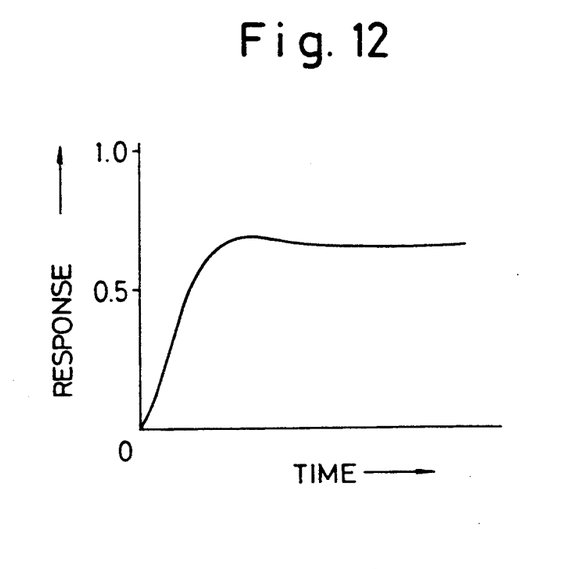
FIG. 12 is a diagram showing an example of the normative response system.

As shown in FIG. 11, a feedback control system and the automobile as the object of control are regarded as one system, and the transfer characteristics between the input and output of this system are caused to correspond to the transfer characteristics of the normative response system as a target. For example, a step response waveform is used as this normative response system, as shown in FIG. 12.

The transfer function of the feedback control system can be expressed as follows:

$$c(s)/s = (c0 + c1 \times s + c2 \times s^2 + \ldots)/s. \quad (35)$$

Meanwhile, the denominator of the transfer function of the normative response system can be expressed as follows:

$$r(s) = 1 + r0 + r1 \times qs + r2 \times q^2 \times s^2 + \quad (36)$$

where q is an element for normalizing the response time. $1 + r0, r1, r2, \ldots$ are parameters for determining the response waveform, and these values can be selected as required.

Figure 13:
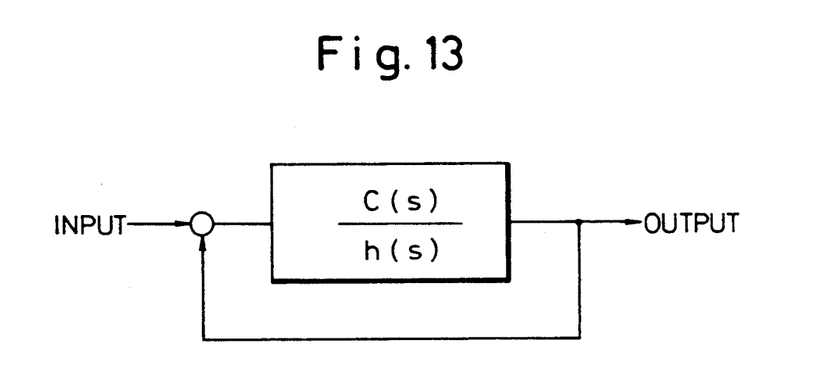
FIGS. 13 and 14 are diagrams for illustrating the calculation of gains according to the second embodiment.

An open-loop transfer function of the system, including the feedback control system and the automobile, is given by $$Go(s) = c(s)/h(s), \quad (37)$$

and this is shown in FIG. 13.

On the other hand, a closed-loop transfer function of the system can be expressed as follows:

$$Gc(s) = 1/((h(s)/c(s)) + 1). \quad (38)$$

Figure 14:
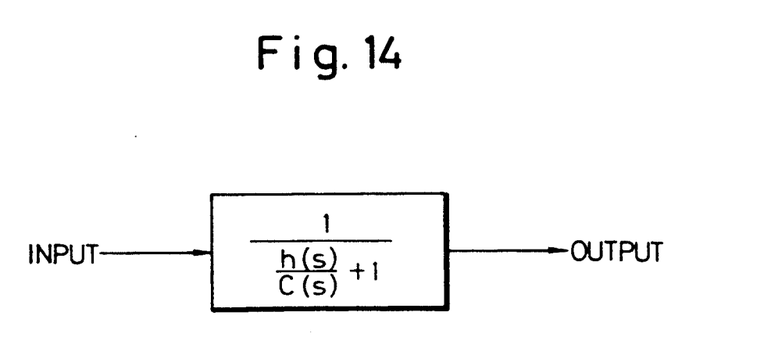

This is shown in FIG. 14.

If the closed-loop transfer function Gc(c) is equal to a transfer function $1/r(s)$ of the normative response system, the following equation holds true.

$$c(s) = h(s)/(r(s) - 1). \quad (39)$$

If the right side of equation (39) is developed into a denominator-based polynomial expression and if the respective coefficients of the individual terms are c0, c1 and c2, in order of degree in an ascending scale, these values c0, c1 and c2 can be expressed as follows:

$$c0 = h0/r0, \quad (40)$$

$$c1 = (h0/r0) \times ((h1/h0) - q \times (r1/r0), \quad (41)$$

$$c2 = (h0/r0) \times ((h2/h0) - q(h1/h0) \times (r1/r0) + \quad (42)$$
$$q^2 \times ((r1^2/r0^2) - (r2/r0))),$$

$$c3 = (h0/r0) \times ((h3/h0) - q \times (h2/h0) \times (r1/r0) + \quad (43)$$
$$q^2 \times ((r1^2/r0^2) - (r2/r0)) \times (h1/h0) + q^3 \times (-(r1^3/r0^3) +$$
$$(2r1 \times r2)/r0^2 - (r3/r0))).$$

With respect to the aforementioned PID operation, c(s) can be given by the following quadratic equations.

$$c(s) = c0 + c1s + c2s^2. \quad (44)$$

Accordingly, equation (43) is solved with c3=0.

Supposing the minimum positive value out of the solutions of equation (43) to be q and substituting q into equations (41) and (42), we can obtain c0, c1 and c2. As mentioned before, these values c0, c1 and c2 represent the integral, proportional, and differential gains, respectively, for the PID operation.

Referring now to the flow chart of FIG. 15, the operation of the output control apparatus of the second embodiment will be described.

Figure 7:
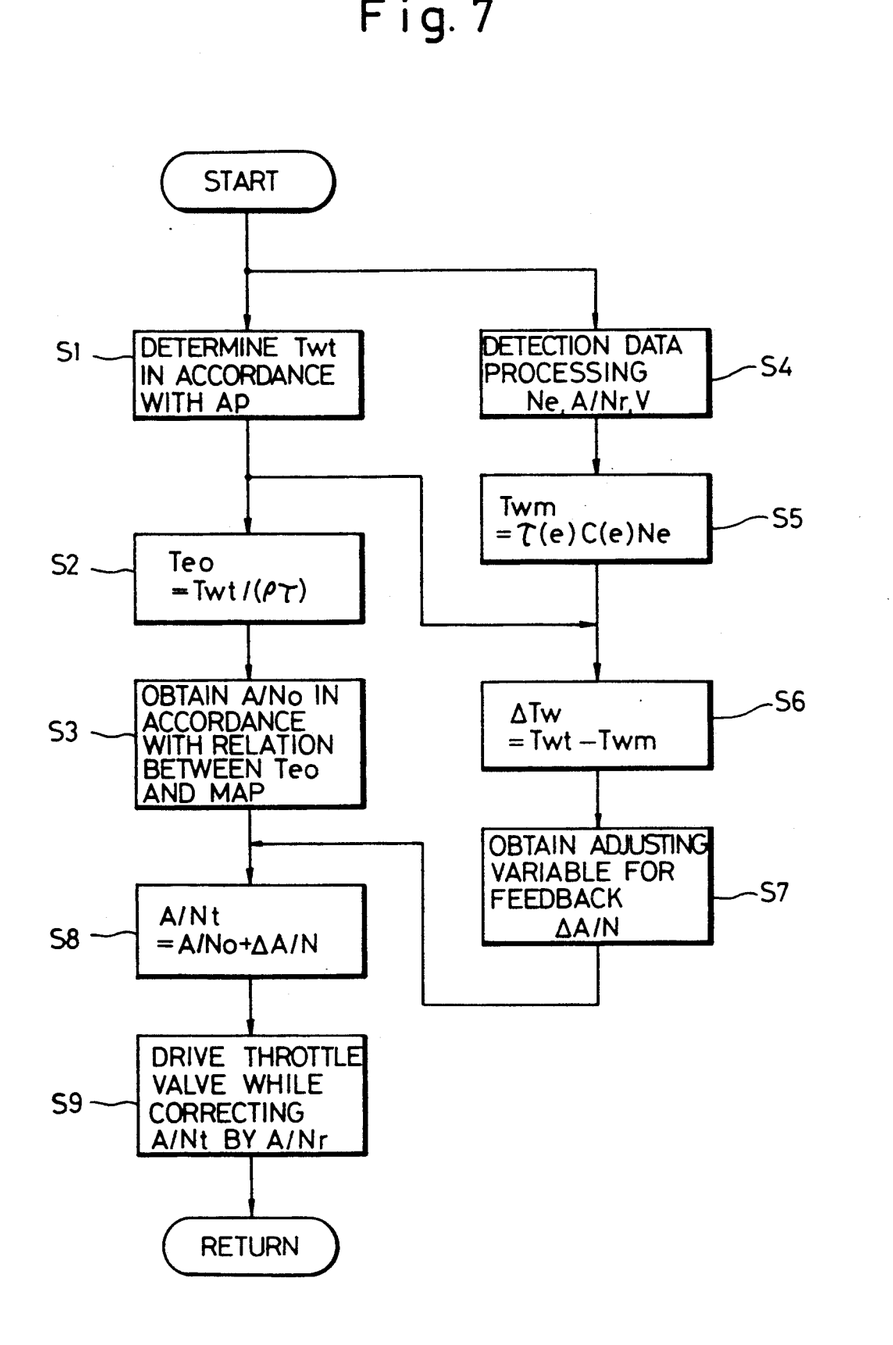
FIG. 7 is a flow chart for illustrating the operation of an output control apparatus according to a first embodiment of this invention.
Figure 15:
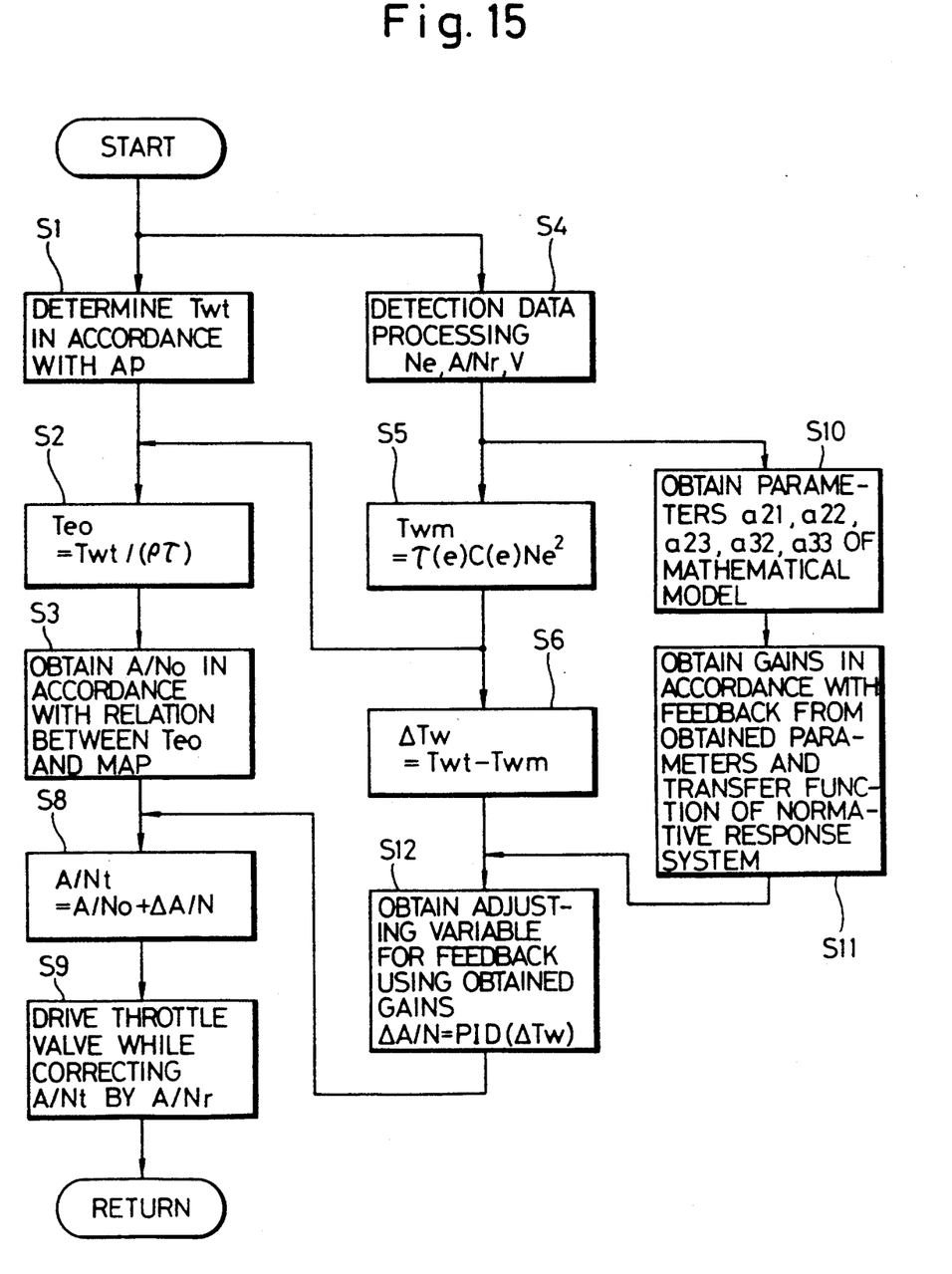
FIG. 15 is a flow chart for illustrating the operation of the second embodiment.

Steps S1 to S6 and Steps S8 and S9, in FIG. 15, are executed in the same manner as in the case of the first embodiment shown in FIG. 7, so that a description of these steps is omitted. In the case of the second embodiment, the adjusting variable $\Delta A/N$ for the feedback control is obtained in Steps S10 to S12. More specifically, the parameters a21, a22, a23, a32 and a33 of the mathematical model shown in FIG. 7 are obtained in Step S10, and in the next Step S11, the integral, proportional, and differential gains for the feedback control are obtained individually in accordance with these parameters and the transfer function of the normative response system. In Step S12, moreover, the adjusting variable $\Delta A/N$ is calculated on the basis of the individual gains obtained in Step S11, and thereafter, the aforesaid Steps S8 and S9 are executed in succession to control the opening of the throttle valve 8.

In the case of the second embodiment described above, the values of the individual parameters of the linear mathematical model change as the behavior of the automobile changes, that is, as the air amount Ar for the explosion stroke, engine rotating speed Ne, and vehicle speed V change. In individually calculating the integral, proportional, and differential gains in accordance with these parameters, the integral, proportional, and differential gains are calculated so that the characteristic observed before the torque is actually transmitted to the driving shaft 15 after the suction in the supposed system including the automobile and the feedback control system closely resembles the transfer characteristic of the normative response system. Accordingly, by calculating the adjusting variable ΔA/N in accordance with these gains and controlling the opening of the throttle valve 8 in consideration of this adjusting variable ΔA/N, the actual torque of the driving shaft 15 can be controlled in an optimum state. Thus, in the case of this second embodiment, the torque of the driving shaft 15 can be controlled so that the characteristics for the processes of production and transmission of the power of the automobile are always linearly grasped without regard to the change of the behaviour of the automobile, and the transfer characteristic of the aforesaid system closely resembles the transfer characteristic of the normative response system. Accordingly, the responsiveness obtained before the torque is transmitted to the driving shaft 15 after the suction can be greatly improved, and the actual torque of the driving shaft 15 can be quickly adjusted to the target torque with high accuracy. In consequence, with use of the output control apparatus of this invention, an auto-cruise control system and a traction control system of the automobile can be unified as one control system.

In the case of this second embodiment, moreover, the individual gains for the PID operation are obtained from the parameters of the mathematical model, so that the automobile need not undergo a drive test to obtain these gains.

If the calculation section 50 is previously stored with the mathematical model, furthermore, troubleshooting for the automobile can be also effected by using this mathematical model.

In the first and second embodiments, any of the P, PI, PD, and PID operations is performed in the adjustment section 33, as described before. Besides these operations, however, state feedback control may be effected.

In this case, the adjusting variable ΔA/N can be calculated on the basis of the following equation.

$$\Delta A/N = k1A/Nr + k2Ne + k3V,$$

where k1, k2 and k3 are gains.

In the calculation section 60, the parameters of the mathematical model obtained in the calculation section 50 are used, and the gains k1, k2 and k3 are calculated so that a change of the torque given by the following equation is minimized.

$$E = \int_0^\infty (\Delta Tw^2 + Ai^2)dt.$$

Although the throttle valve 8 is driven by means of the DC motor 9 in the foregoing embodiments, a stepping motor may be used in place of this DC motor 9. In this case, the stepping motor is supplied with pulses corresponding to the target throttle opening. Further, the drive source for the throttle valve 8 is not limited to an electric motor, and a hydraulic motor or a pneumatic motor may be used for this purpose.

In each embodiment of this invention, furthermore, the engine is a gasoline engine, and the output of this engine is controlled by means of the suction air amount. In the case of a diesel engine, however, a fuel injection quantity is controlled in place of the suction air amount.

INDUSTRIAL AVAILABILITY

An output control apparatus for an internal combustion engine of this invention is intended to control the output of the internal combustion engine. Therefore, in the output control apparatus, a target torque of a driving shaft of an automobile is determined in accordance with a pedaling stroke when an accelerator pedal of the automobile is worked, and then an actual torque of the driving shaft is quickly adjusted to the target torque with high accuracy. Thus, the output control apparatus of this invention can be applied to an auto-cruise control system or traction control system of the automobile, or a control system uniting these systems.

We claim:

1. An output control apparatus for an internal combustion engine, comprising:
   adjusting means for varying the output of the internal combustion engine mounted on an automobile in accordance with an adjusting variable;
   means for determining a target torque of a driving shaft of the automobile;
   means for detecting an actual torque of the driving shaft;
   means for obtaining a deviation between the target torque and the actual torque obtained by said target and actual torque determining means;
   means for obtaining a steady-state output torque of the internal combustion engine, required for applying the target torque to the driving shaft, on the assumption that the whole system of the automobile, including the internal combustion engine, is in a steady-state operation mode;
   means for obtaining a reference adjusting variable of the adjusting means so that the steady-state output torque is produced in the internal combustion engine;
   means for obtaining a target adjusting variable of the adjusting means by correcting the reference adjusting variable in accordance with a feedback amount based on said deviation; and
   means for regulating an actual adjusting variable of the adjusting means so that the actual adjusting variable becomes equal to the target adjusting variable.

2. The output control apparatus for an internal combustion engine according to claim 1, wherein said means for obtaining the target adjusting variable includes a linear mathematical model representing processes of production and transmission of power, from the internal combustion engine to the driving shaft in the automobile, as a deviation from the steady-state operation mode, by means of a plurality of parameters, based on the state that the whole system of the automobile, including the internal combustion engine, is in the steady-state operation mode, means for obtaining the parameters of the mathematical model by inverse calculation in accordance with variables indicative of the behavior of the automobile, and means for obtaining gains for determining the feedback amount in accordance with the parameters.

3. The output control apparatus for an internal combustion engine according to claim 2, wherein said means for obtaining the gains sets the gains so that the characteristic of one supposed system incorporating the whole mechanism of the automobile, including a control system for determining the feedback amount, closely resembles the transfer characteristic of a normative response system.

4. The output control apparatus for an internal combustion engine according to claim 1, wherein said adjusting means includes an electric motor for driving a throttle valve of the internal combustion engine to adjust the amount of suction air as an adjusting variable, and said means for determining the target torque includes a sensor for detecting the pedaling stroke of an accelerator pedal of the automobile, and means for previously establishing the relationship between the pedaling stroke and the target torque.

5. The output control apparatus for an internal combustion engine according to claim 4, wherein said means for determining the target torque includes a sensor for detecting the speed of the automobile, and said target torque is determined in consideration of the vehicle speed, besides the pedaling stroke.

6. The output control apparatus for an internal combustion engine according to claim 5, wherein said reference adjusting variable is obtained from a characteristic indicative of the relationship between the suction air amount and the steady-state output torque.

7. The output control apparatus for an internal combustion engine according to claim 2, wherein said mathematical model is intended for an automobile furnished with an automatic transmission, and said parameters of the mathematical model are obtained by inverse calculation based on the vehicle speed, the engine rotating speed, and the amount of air used for an explosion stroke of the internal combustion engine, as the variables indicative of the behavior of the automobile.

8. The output control apparatus for an internal combustion engine according to claim 3, wherein said feedback amount is determined on the basis of a PID operation.

* * * * *